(12) United States Patent
Li et al.

(10) Patent No.: US 12,149,972 B2
(45) Date of Patent: *Nov. 19, 2024

(54) METHOD AND APPARATUS FOR DETERMINING APPLICATION TIME OF CSI REPORT, AND DEVICE

(71) Applicant: Huawei Technologies Co., Ltd., Shenzhen (CN)

(72) Inventors: Bingzhao Li, Beijing (CN); Xiaodong Yang, Shenzhen (CN); Wei Quan, Beijing (CN); Zhenxing Hu, Shenzhen (CN); Jian Zhang, Shenzhen (CN); Jinhua Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 552 days.

This patent is subject to a terminal disclaimer.

(21) Appl. No.: 16/813,245

(22) Filed: Mar. 9, 2020

(65) Prior Publication Data

US 2020/0213889 A1   Jul. 2, 2020

Related U.S. Application Data

(63) Continuation of application No. 15/728,246, filed on Oct. 9, 2017, now Pat. No. 10,616,785, which is a
(Continued)

(51) Int. Cl.
  *H04W 24/10*   (2009.01)
  *H04B 7/24*   (2006.01)
  (Continued)

(52) U.S. Cl.
  CPC .............. *H04W 24/10* (2013.01); *H04B 7/24* (2013.01); *H04L 5/0057* (2013.01);
  (Continued)

(58) Field of Classification Search
  CPC ............. H04W 24/10; H04W 72/0413; H04W 72/042; H04B 7/24; H04L 5/0057
  (Continued)

(56) References Cited

U.S. PATENT DOCUMENTS

| 10,090,988 B2 | 10/2018 | Takeda et al. |
| 2013/0258874 A1 | 10/2013 | Khoshnevis et al. |

(Continued)

FOREIGN PATENT DOCUMENTS

| CN | 102469570 A | 5/2012 |
| CN | 102647248 A | 8/2012 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.5.0 (Mar. 2015), 239 pages.

(Continued)

*Primary Examiner* — Christopher M Crutchfield
*Assistant Examiner* — Jean F Voltaire
(74) *Attorney, Agent, or Firm* — Slater Matsil, LLP

(57) ABSTRACT

A method includes: obtaining, by a communication device, a configuration message sent and a secondary cell activation command for a first secondary cell; determining, by the communication device, according to the configuration message, a second secondary cell configured with a physical uplink control channel (PUCCH), the second secondary cell is in an active state, sending, by the communication device, after a preset time point after the secondary cell activation command is received, a channel status information (CSI) report of a first secondary cell on the PUCCH of the second secondary cell.

20 Claims, 3 Drawing Sheets

UE receives a configuration message sent by a base station, and determines, according to the configuration message, a type of a PUCCH that is used by a secondary cell to report a CSI report — 101

The UE receives a secondary cell activation command that is sent by the base station and that carries a cell identity — 102

The UE determines, according to the type of the PUCCH that is used by the secondary cell to report the CSI report and the secondary cell activation command, an application time of a CSI report of a secondary cell corresponding to the cell identity — 103

Related U.S. Application Data continuation of application No. PCT/CN2015/076287, filed on Apr. 10, 2015.

(51) Int. Cl.
*H04L 5/00* (2006.01)
*H04W 72/21* (2023.01)
*H04W 72/23* (2023.01)

(52) U.S. Cl.
CPC ........... *H04W 72/21* (2023.01); *H04W 72/23* (2023.01); *H04L 5/0007* (2013.01)

(58) Field of Classification Search
USPC ........................................ 370/329
See application file for complete search history.

(56) References Cited

U.S. PATENT DOCUMENTS

| | | |
|---|---|---|
| 2013/0258882 A1 | 10/2013 | Dinan |
| 2014/0092787 A1 | 4/2014 | Han et al. |
| 2014/0092826 A1 | 4/2014 | Eriksson et al. |
| 2014/0219237 A1 | 8/2014 | Charbit et al. |
| 2014/0314000 A1 | 10/2014 | Liu et al. |
| 2015/0195830 A1* | 7/2015 | Takeda .................. H04L 1/0026 370/329 |
| 2015/0271806 A1 | 9/2015 | Kim et al. |
| 2015/0334603 A1 | 11/2015 | Uchino et al. |
| 2016/0021628 A1 | 1/2016 | Jang et al. |
| 2016/0080129 A1 | 3/2016 | Jang et al. |
| 2016/0234718 A1* | 8/2016 | Thangarasa ....... H04W 28/0205 |
| 2016/0255577 A1* | 9/2016 | Kazmi .............. H04W 52/0206 370/311 |
| 2016/0262118 A1* | 9/2016 | Kim ........................ H04L 5/001 |
| 2016/0278073 A1* | 9/2016 | Dinan .................... H04L 5/001 |
| 2016/0278083 A1* | 9/2016 | Dinan .................... H04L 5/0053 |
| 2016/0316427 A1* | 10/2016 | Teng ................. H04W 28/0205 |

FOREIGN PATENT DOCUMENTS

| | | |
|---|---|---|
| CN | 103620984 A | 3/2014 |
| CN | 103703833 A | 4/2014 |
| CN | 104509193 A | 4/2015 |
| JP | 2012170080 A | 9/2012 |
| JP | 2014082733 A | 5/2014 |
| WO | 2014021210 A1 | 2/2014 |
| WO | 2014050529 A1 | 4/2014 |
| WO | 2014058222 A1 | 4/2014 |
| WO | 2014208560 A1 | 12/2014 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 12)," 3GPP TS 36.321 V12.5.0, Mar. 2015, 77 pages.

Ericsson, "PUCCH on SCell," 3GPP TSG-RAN WG2 #89, R2-150389, Athens, Greece, Feb. 9-13, 2015, 4 pages.

"3rd Generation Partnership Project;Technical Specification Group Radio Access Network; Evolved Universal Terrestrial Radio Access (E-UTRA); Requirements for support of radio resource management (Release 12)", 3GPP TS 36.133 V12.7.0 (Mar. 2015), 1014 pages.

3GPP TS 24.008 V13.1.0 (Mar. 2015),3rd Generation Partnership Project;Technical Specification Group Core Network and Terminals;Mobile radio interface Layer 3 specification;Core network protocols; Stage 3(Release 13), total 714 pages.

Technical Specification Group Radio Access Network;Evolved Universal Terrestrial Radio Access Network (E-UTRAN); X2 application protocol (X2AP), Mar. 2015, 3GPP TS 36.423 V11.9.0 (Year: 2015), total 144 pages.

* cited by examiner

METHOD AND APPARATUS FOR DETERMINING APPLICATION TIME OF CSI REPORT, AND DEVICE

CROSS-REFERENCE TO RELATED APPLICATIONS

This application is a continuation of U.S. patent application Ser. No. 15/728,246, filed on Oct. 9, 2017, which is a continuation of International Application No. PCT/CN2015/076287, filed on Apr. 10, 2015. All of the mentioned patent applications are hereby incorporated by reference in their entireties.

TECHNICAL FIELD

The present invention relates to communications technologies, and in particular, to a method and an apparatus for determining an application time of a channel status information (CSI) report, and a device.

BACKGROUND

Carrier aggregation (CA) means that a quantity of carriers used in a communication process is not limited to only one, and communication is performed simultaneously on one primary component carrier and several secondary component carriers. Cells in which UE that has a carrier aggregation function aggregates are classified into one primary cell and several secondary cells.

In the prior art, user equipment (UE) usually reports channel status information (CSI) of all cells to a base station by using a physical uplink control channel (PUCCH) of a primary cell. Specifically, when the UE receives, at a subframe N, a secondary cell activation command sent by the base station, the UE starts at a preset time (N+8) to send a CSI report carrying CSI of an activated secondary cell to the base station. For an inactive secondary cell, a time at which the UE obtains valid CSI may vary with tracking states of the inactive secondary cell by the UE. It is possible that the UE has not obtained a valid CSI measurement value for a CSI report in the beginning of the preset time. In this case, the UE needs to fill the CSI with a special measurement value, so as to inform the base station that the UE has not obtained a valid measurement value. The UE does not start to fill a normal CSI measurement value until the UE starts to obtain a valid CSI measurement value.

Because CSI of all cells are reported to a base station by using a PUCCH of a primary cell, PUCCH loads of the primary cell are excessively high. Therefore, introduction of a PUCCH to a secondary cell is currently discussed in 3GPP, so that some secondary cells report CSI reports to a base station by using the PUCCH of a secondary cell. However, the secondary cell to which a PUCCH is introduced may be in an inactive state. In this case, it cannot be ensured that the secondary cell starts CSI reporting at a preset time. Therefore, reliability of a system is decreased.

SUMMARY

Embodiments of the present invention provide a method and an apparatus for determining an application time of a CSI report, and a device, so as to improve reliability of a system.

According to a first aspect, an embodiment of the present invention provides a method for determining an application time of a CSI report. The method includes receiving, by user equipment UE, a configuration message sent by a base station, and determining, according to the configuration message, a type of a physical uplink control channel PUCCH that is used by a secondary cell to report a CSI report. The method includes receiving, by the UE, a secondary cell activation command that is sent by the base station and that carries a cell identity. The method also includes determining, by the UE according to the type of the PUCCH that is used by the secondary cell to report the CSI report and the secondary cell activation command, an application time of a CSI report of a secondary cell corresponding to the cell identity.

With reference to the first aspect, in a first possible implementation of the first aspect, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a primary cell, starting, by the UE at a preset time point after the secondary cell activation command is received, to apply the CSI report of the secondary cell corresponding to the cell identity.

With reference to the first aspect, in a second possible implementation of the first aspect, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after a preset time point after the secondary cell activation command is received, to apply the CSI report of the secondary cell corresponding to the cell identity.

With reference to the first aspect, in a third possible implementation of the first aspect, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after the UE sends a channel sounding reference signal SRS to the base station, to apply the CSI report of the secondary cell corresponding to the cell identity.

With reference to the first aspect, in a fourth possible implementation of the first aspect, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after the UE sends a preamble to the base station, to apply the CSI report of the secondary cell corresponding to the cell identity.

With reference to the first aspect, in a fifth possible implementation of the first aspect, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, determining, by the UE, whether a secondary cell including a PUCCH is in an active state; and if the secondary cell including the PUCCH is in an active state, starting, by the UE at a preset time point after the secondary cell activation command is received, to apply the CSI report of the secondary cell corresponding to the cell identity; or if the secondary cell including the PUCCH is in an inactive state, determining, by the UE according to an application time of a CSI report of the secondary cell including the PUCCH, the application time of the CSI report of the secondary cell corresponding to the cell identity.

With reference to any one of the first aspect, or the first to the fifth possible implementations of the first aspect, in a sixth possible implementation of the first aspect, the application time of the CSI report of the secondary cell corresponding to the cell identity includes: that the CSI report of the secondary cell corresponding to the cell identity is carried in a CSI report at a current time point corresponding to the application time and subsequent CSI reports.

With reference to the first aspect, in a seventh possible implementation of the first aspect, the method further includes: starting, by the UE at a preset time point after the secondary cell activation command is received, a deactivation timer of the secondary cell corresponding to the cell identity; or performing, by the UE after a preset time point after the secondary cell activation command is received, at least one of the following operations: sending a listening reference signal to the base station, sending a scheduling request signal to the base station, or listening to a physical downlink control channel.

According to a second aspect, an embodiment of the present invention provides an apparatus for determining an application time of a CSI report. The apparatus includes a receiving module, configured to receive a configuration message sent by a base station. The apparatus also includes a determining module, configured to determine, according to the configuration message received by the receiving module, a type of a physical uplink control channel PUCCH that is used by a secondary cell to report a CSI report. The receiving module is further configured to receive a secondary cell activation command that is sent by the base station and that carries a cell identity. The determining module is further configured to determine, according to the type of the PUCCH that is used by the secondary cell to report the CSI report and the secondary cell activation command, an application time of a CSI report of a secondary cell corresponding to the cell identity.

With reference to the second aspect, in a first possible implementation of the second aspect, the determining module is specifically configured to: if a type of a PUCCH that is used by the secondary cell corresponding to the cell identity to report the CSI report is a PUCCH of a primary cell, start, at a preset time point after the receiving module receives the secondary cell activation command, to apply the CSI report of the secondary cell corresponding to the cell identity.

With reference to the second aspect, in a second possible implementation of the second aspect, the determining module is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after a preset time point after the receiving module receives the secondary cell activation command, to apply the CSI report of the secondary cell corresponding to the cell identity.

With reference to the second aspect, in a third possible implementation of the second aspect, the apparatus further includes a sending module, where the sending module is configured to send a channel sounding reference signal SRS to the base station; and the determining module is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the sending module sends the channel sounding reference signal SRS to the base station, to apply the CSI report of the secondary cell corresponding to the cell identity.

With reference to the second aspect, in a fourth possible implementation of the second aspect, the apparatus further includes a sending module, where the sending module is configured to send a preamble to the base station; and the determining module is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the sending module sends the preamble to the base station, to apply the CSI report of the secondary cell corresponding to the cell identity.

With reference to the second aspect, in a fifth possible implementation of the second aspect, the apparatus further includes a judging module, where the judging module is configured to determine whether a secondary cell including a PUCCH is in an active state; and the determining module is specifically configured to: if a type of a PUCCH that is used by the secondary cell corresponding to the cell identity to report the CSI report is a PUCCH of a secondary cell, and the judging module determines that the secondary cell including the PUCCH is in an active state, start, at a preset time point after the receiving module receives the secondary cell activation command, to apply the CSI report of the secondary cell corresponding to the cell identity; or if a type of a PUCCH that is used by the secondary cell corresponding to the cell identity to report the CSI report is a PUCCH of a secondary cell, and the judging module determines that the secondary cell including the PUCCH is in an inactive state, determine, according to an application time of a CSI report of the secondary cell including the PUCCH, the application time of the CSI report of the secondary cell corresponding to the cell identity.

With reference to any one of the second aspect, or the first to the fifth possible implementations of the second aspect, in a sixth possible implementation of the second aspect, the application time of the CSI report of the secondary cell corresponding to the cell identity includes that the CSI report of the secondary cell corresponding to the cell identity is carried in a CSI report at a current time point corresponding to the application time and subsequent CSI reports.

With reference to the second aspect, in a seventh possible implementation of the second aspect, the apparatus further includes: a starting module, configured to start, at a preset time point after the receiving module receives the secondary cell activation command, a deactivation timer of the secondary cell corresponding to the cell identity; and a processing module, configured to trigger, after the preset time point after the receiving module receives the secondary cell activation command, the following module to perform at least one of the following operations: a sending module sends a listening reference signal to the base station, the sending module sends a scheduling request signal to the base station, or the processing module listens to a physical downlink control channel.

According to a third aspect, an embodiment of the present invention provides a UE. The UE includes a receiver, configured to receive a configuration message sent by a base station. The UE also includes a processor, configured to determine, according to the configuration message received by the receiver, a type of a physical uplink control channel PUCCH that is used by a secondary cell to report a CSI report. The receiver is further configured to receive a secondary cell activation command that is sent by the base station and that carries a cell identity. The processor is configured to determine, according to the type of the PUCCH that is used by the secondary cell to report the CSI report and the secondary cell activation command, an application time of a CSI report of a secondary cell corresponding to the cell identity.

With reference to the third aspect, in a first possible implementation of the third aspect, the processor is specifically configured to: if a type of a PUCCH that is used by the secondary cell corresponding to the cell identity to report the CSI report is a PUCCH of a primary cell, start, at a preset time point after the receiver receives the secondary cell activation command, to apply the CSI report of the secondary cell corresponding to the cell identity.

With reference to the third aspect, in a second possible implementation of the third aspect, the processor is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after a preset time point after the receiver receives the secondary cell activation command, to apply the CSI report of the secondary cell corresponding to the cell identity.

With reference to the third aspect, in a third possible implementation of the third aspect, the UE further includes a transmitter, where the transmitter is configured to send a channel sounding reference signal SRS to the base station; and the processor is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the transmitter sends the channel sounding reference signal SRS to the base station, to apply the CSI report of the secondary cell corresponding to the cell identity.

With reference to the third aspect, in a fourth possible implementation of the third aspect, the UE further includes a transmitter, where the transmitter is configured to send a preamble to the base station; and the processor is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, by the UE after the secondary cell corresponding to the cell identity is activated and after the transmitter sends the preamble to the base station, to apply the CSI report of the secondary cell corresponding to the cell identity.

With reference to the third aspect, in a fifth possible implementation of the third aspect, the processor is specifically configured to: if a type of a PUCCH that is used by the secondary cell corresponding to the cell identity to report the CSI report is a PUCCH of a secondary cell, determine whether a secondary cell including a PUCCH is in an active state; and if the secondary cell including the PUCCH is in an active state, start, at a preset time point after the receiver receives the secondary cell activation command, to apply the CSI report of the secondary cell corresponding to the cell identity; or if the secondary cell including the PUCCH is in an inactive state, determine, according to an application time of a CSI report of the secondary cell including the PUCCH, the application time of the CSI report of the secondary cell corresponding to the cell identity.

With reference to any one of the third aspect, or the first to the fifth possible implementations of the third aspect, in a sixth possible implementation of the third aspect, the application time of the CSI report of the secondary cell corresponding to the cell identity includes that the CSI report of the secondary cell corresponding to the cell identity is carried in a CSI report at a current time point corresponding to the application time and subsequent CSI reports.

With reference to the third aspect, in a seventh possible implementation of the third aspect, the processor is further configured to start, at a preset time point after the receiver receives the secondary cell activation command, a deactivation timer of the secondary cell corresponding to the cell identity; or the processor is further configured to trigger, after a preset time point after the receiver receives the secondary cell activation command, a transmitter and/or the processor to perform at least one of the following operations: the transmitter sends a listening reference signal to the base station, the transmitter sends a scheduling request signal to the base station, or the processor listens to a physical downlink control channel.

According to the method and the apparatus for determining an application time of a CSI report, and the device that are provided in the embodiments of the present invention, UE receives a configuration message sent by a base station and determines, according to the configuration message, a type of a PUCCH that is used by a secondary cell to report a CSI report; and the UE receives a secondary cell activation command that is sent by the base station and that carries a cell identity, and determines, according to the type of the PUCCH that is used by the secondary cell to report the CSI report and the secondary cell activation command, an application time of a CSI report of a secondary cell corresponding to the cell identity. Because UE determines an application time of a CSI report of a secondary cell according to a type of a PUCCH that is used by a secondary cell to report a CSI report, a prior-art phenomenon is avoided that it cannot be ensured that a secondary cell applies a CSI report at a preset time, and reliability of a system is improved.

BRIEF DESCRIPTION OF THE DRAWINGS

To describe the technical solutions in the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
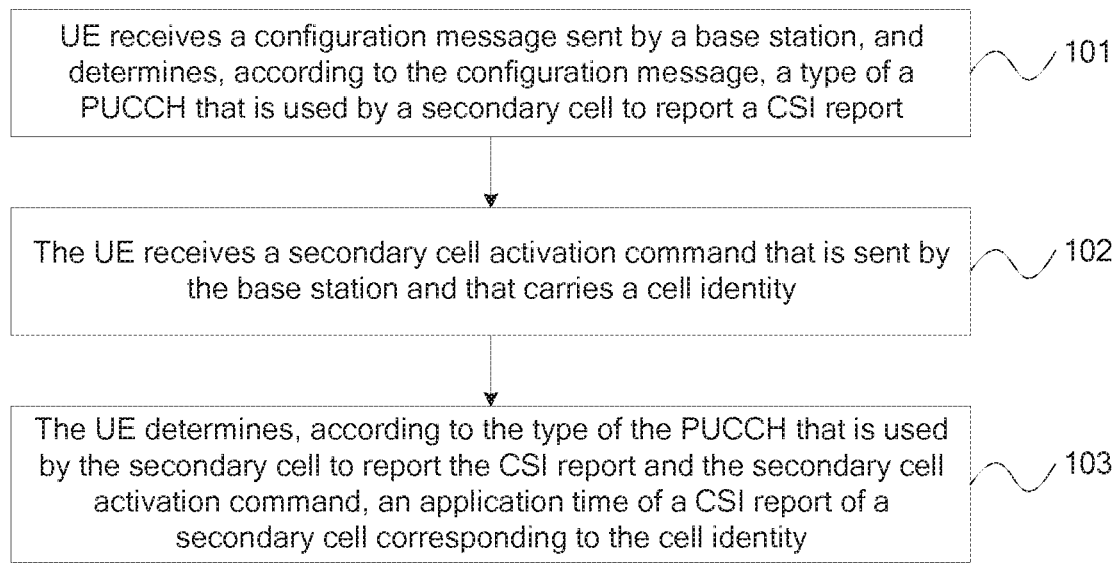
FIG. 1 is a schematic flowchart of Embodiment 1 of a method for determining a reporting time of channel status information CSI according to an embodiment of the present invention.

FIG. 1 is a schematic flowchart of Embodiment 1 of a method for determining a reporting time of channel status information CSI according to the present invention. This embodiment of the present invention provides a method for determining a reporting time of channel status information CSI, and this embodiment is executed by UE. As shown in FIG. 1, the method according to this embodiment may include the following steps.

Step 101. UE receives a configuration message sent by a base station, and determines, according to the configuration message, a type of a PUCCH that is used by a secondary cell to report a CSI report.

In this embodiment, the type of the PUCCH includes a PUCCH of a primary cell and a PUCCH of a secondary cell. After receiving the configuration message sent by the base station, the UE determines, according to the configuration message, which secondary cells report CSI reports by using the PUCCH of the primary cell and which secondary cells report CSI reports by using the PUCCH of the secondary cell.

For example, the base station configures for the UE multiple cells, for example, 8 cells: a cell 1, a cell 2, a cell 3, a cell 4, a cell 5, a cell 6, a cell 7, and a cell 8. The cell 1 is a primary cell, the rest cells are secondary cells, and the cell 1 and the cell 5 have been configured with a PUCCH. It is assumed that CSI reports of the cell 1, the cell 2, the cell 3, and the cell 4 are carried by a PUCCH of the primary cell, that is, the PUCCH of the cell 1, and that CSI reports of the cell 5, the cell 6, the cell 7, and the cell 8 are carried by a PUCCH of a secondary cell, that is, the PUCCH of the cell 5.

Step 102. The UE receives a secondary cell activation command that is sent by the base station and that carries a cell identity.

In this embodiment, after the secondary cell activation command sent by the base station is received, the UE activates a secondary cell corresponding to the cell identity carried in the secondary cell activation command. It should be noted that, the secondary cell activation command may carry one or more cell identities, that is, the UE may activate one or more secondary cells according to the secondary cell activation command.

Step 103. The UE determines, according to the type of the PUCCH that is used by the secondary cell to report the CSI report and the secondary cell activation command, an application time of a CSI report of a secondary cell corresponding to the cell identity.

In this embodiment, after determining the type of the PUCCH that is used by the secondary cell to report the CSI report, and activating a corresponding secondary cell according to a secondary cell activation command, the UE determines application times of CSI reports of activated secondary cells according to different types of PUCCHs that are used by the secondary cells to report CSI reports.

According to the method for determining an application time of a CSI report provided in this embodiment of the present invention, UE receives a configuration message sent by a base station and determines, according to the configuration message, a type of a PUCCH that is used by a secondary cell to report a CSI report; and the UE receives a secondary cell activation command that is sent by the base station and that carries a cell identity, and determines, according to the type of the PUCCH that is used by the secondary cell to report the CSI report and the secondary cell activation command, an application time of a CSI report of a secondary cell corresponding to the cell identity. Because UE determines an application time of a CSI report of a secondary cell according to a type of a PUCCH that is used by a secondary cell to report a CSI report, a prior-art phenomenon is avoided that it cannot be ensured that a secondary cell applies a CSI report at a preset time, and reliability of a system is improved.

In Embodiment 2 of the present invention, according to the foregoing method embodiment, optionally, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a primary cell, starting, by the UE at a preset time point after the secondary cell activation command is received, to apply the CSI report of the secondary cell corresponding to the cell identity.

Specifically, the UE determines, according to the secondary cell identity that is carried in the secondary cell activation command, a secondary cell that needs to be activated, and determines, according to a type of a PUCCH that is used, by the secondary cell that needs to be activated, to report a CSI report, that the type of the PUCCH that is used, by the secondary cell that needs to be activated, to report the CSI report is a PUCCH of a primary cell. In this case, the UE starts, at the preset time point after the secondary cell activation command is received, to apply the CSI report of the secondary cell corresponding to the cell identity. That the UE starts to apply the CSI report of the secondary cell corresponding to the cell identity includes that the CSI report of the secondary cell is carried in both a CSI report at a current time point corresponding to the application time and subsequent CSI reports. In a specific implementation process, the preset time point may be set according to actual needs or a time at which the UE receives the secondary cell activation command. For example, if the UE receives the secondary cell activation command at subframe N, the preset time point may be set to a time point corresponding to subframe (N+8), that is, the UE starts at subframe (N+8) to report the CSI report of the secondary cell. Selection of a specific value of the preset time point is not particularly limited herein in this embodiment of the present invention.

In Embodiment 3 of the present invention, according to the foregoing method embodiment, optionally, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after a preset time point after the secondary cell activation command is received, to apply the CSI report of the secondary cell corresponding to the cell identity; or, if a type of a PUCCH that is used by the secondary cell corresponding to the cell identity is a PUCCH of a secondary cell, the secondary cell is a secondary cell including a PUCCH, and the secondary cell is in an active state, starting, after a preset time point after the secondary cell activation command is received, to apply the CSI report of the secondary cell corresponding to the cell identity.

Specifically, a secondary cell that needs to be activated is determined according to a cell identity, of the secondary cell, that is carried in the secondary cell activation command, a type of a PUCCH that is used, by the secondary cell that needs to be activated, to report a CSI report is determined to be a PUCCH of a secondary cell according to the type of the PUCCH that is used, by the secondary cell that needs to be activated, to report the CSI report, and the secondary cell that needs to be activated is a secondary cell including a PUCCH. In this case, the secondary cell needs to complete secondary cell timing synchronization after receiving an activation command, and time spent in completing the synchronization varies depending on a channel condition of the secondary cell or a status, of the secondary cell, measured by the UE. As a result, the UE completes activation at different time points. Therefore, the UE needs to determine whether the secondary cell including the PUCCH has been activated at the preset time point. If the secondary cell including the PUCCH has been activated at the preset time point, the UE starts, at the preset time point, to apply the CSI report of the secondary cell corresponding to the cell identity. If the secondary cell including the PUCCH has not been activated at the preset time point, the UE starts, after the preset time point and after the secondary cell including the PUCCH is activated, to apply a CSI report of the secondary cell including the PUCCH. For example, if the UE receives the secondary cell activation command at subframe N, and the preset time point is set to a time point corresponding to subframe (N+8), and it is found by determining that the secondary cell including the PUCCH has not been activated at the time point (N+8), and that the secondary cell including the PUCCH is activated at a time point (N+10), the UE starts at subframe (N+10) to apply the CSI report of the secondary cell. If it is found by determining that the secondary cell including the PUCCH has been activated at the time point (N+8), the UE starts at subframe (N+8) to apply the CSI report of the secondary cell. That the UE starts to apply the CSI report of the secondary cell corresponding to the cell identity includes that the CSI report of the secondary cell is carried in both a CSI report at a current time point corresponding to the application time and subsequent CSI reports. In a specific implementation process, the preset time point may be set according to actual needs or a time at which the UE receives the secondary cell activation command, and a preset time period may be set according to actual needs or experience. Selection of specific values of the preset time point and the preset time period is not particularly limited herein in this embodiment of the present invention.

In Embodiment 4 of the present invention, according to the foregoing method embodiment, optionally, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after the UE sends a channel sounding reference signal (SRS) to the base station, to apply the CSI report of the secondary cell corresponding to the cell identity.

Specifically, the UE starts to apply the CSI report of the secondary cell after activating the secondary cell and after sending the SRS signal to the base station, so that the base station determines, according to the received SRS signal, whether the secondary cell has been activated, and starts to receive, according to the SRS signal, a CSI report sent by the UE. That the UE starts to apply the CSI report of the secondary cell corresponding to the cell identity includes that the CSI report of the secondary cell is carried in both a CSI report at a current time point corresponding to the application time and subsequent CSI reports.

In Embodiment 5 of the present invention, according to the foregoing method embodiment, optionally, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell corresponding to the cell identity is a secondary cell including a PUCCH, starting, by the UE after the secondary cell corresponding to the cell identity is activated and after the UE sends a preamble to the base station, to apply the CSI report of the secondary cell corresponding to the cell identity.

In Embodiment 6 of the present invention, according to the foregoing method embodiment, optionally, the determining, according to the type of the PUCCH that is used by the secondary cell to report the CSI report and the secondary cell activation command, an application time of a CSI report of a secondary cell corresponding to the cell identity includes: if a type of a PUCCH that is used by the secondary cell corresponding to the cell identity to report the CSI report is a PUCCH of a secondary cell, and the secondary cell is not configured with a PUCCH, determining, by the UE, whether a secondary cell including a PUCCH is in an active state; and if the secondary cell including the PUCCH is in an active state, starting, by the UE at a preset time point after the secondary cell activation command is received, to apply the CSI report of the secondary cell corresponding to the cell identity; or if the secondary cell including the PUCCH is in an inactive state, determining, by the UE according to an application time of a CSI report of the secondary cell including the PUCCH, the application time of the CSI report of the secondary cell corresponding to the cell identity.

Specifically, if the UE determines that the secondary cell corresponding to the cell identity reports CSI by using a PUCCH of a secondary cell, the UE needs to determine a status of the secondary cell including the PUCCH. If the UE learns that the secondary cell including the PUCCH is in an active state, in this case, similar to the case in which the CSI report is reported by using a PUCCH of a primary cell, the UE starts, at a preset time point after the secondary cell activation command is received, to apply the CSI report of the secondary cell. That the UE starts to apply the CSI report of the secondary cell corresponding to the cell identity includes that the CSI report of the secondary cell is carried in both a CSI report at a current time point corresponding to the application time and subsequent CSI reports. If the UE learns that the secondary cell including the PUCCH is in an inactive state, in this case, the UE needs to determine the application time of the CSI report of the secondary cell according to an application time of a CSI report of the secondary cell including the PUCCH. In actual application, the application time of the CSI report of the secondary cell including the PUCCH is the same as the application time of the CSI report of the secondary cell. Preferably, that the UE determines whether the secondary cell including the PUCCH is in an active state may be performed when the UE receives the secondary cell activation command that is sent by the base station and that carries the cell identity.

According to the method for determining an application time of a CSI report provided in this embodiment of the present invention, UE receives a configuration message sent by a base station and determines, according to the configuration message, a type of PUCCH that is used by a secondary cell to report a CSI report; and the UE receives a secondary cell activation command that is sent by the base station and that carries a cell identity, and determines, according to the type of the PUCCH that is used by the secondary cell to report the CSI report and the secondary cell activation command, an application time of a CSI report of a secondary cell corresponding to the cell identity. Because UE determines an application time of a CSI report of a secondary cell according to a type of a PUCCH that is used by a secondary cell to report a CSI report, a prior-art phenomenon is avoided that it cannot be ensured that a secondary cell applies a CSI report at a preset time, and reliability of a system is improved.

Optionally, the UE starts, at a preset time point after the secondary cell activation command is received, a deactivation timer of the secondary cell corresponding to the cell identity; or the UE performs, after a preset time point after the secondary cell activation command is received, at least one of the following operations: sending a listening reference signal to the base station, sending a scheduling request signal to the base station, or listening to a physical downlink control channel.

In addition, because a secondary cell to which a PUCCH is introduced may be configured to transmit a CSI report or a hybrid automatic repeat request (HARQ) feedback of at least one secondary cell, if the secondary cell to which a PUCCH is introduced is deactivated, the secondary cell is unable to transmit the CSI report or the HARQ feedback. However, another secondary cell that uses the PUCCH may be in an active state. Therefore, data transmission performance is affected.

To resolve this problem, in Embodiment 7 of the present invention, according to the foregoing method embodiment, optionally, the method may further include the following.

The UE receives a configuration message sent by a base station, and determines, according to the configuration message, identity information of at least one second secondary cell that uses a PUCCH of a first secondary cell to transmit a CSI report and/or an HARQ feedback. The UE receives a secondary cell activation command sent by the base station, where the activation command is used to activate the first secondary cell and/or the at least one second secondary cell; the UE activates the first secondary cell and/or the at least one second secondary cell according to the secondary cell activation command; the UE deactivates the first secondary cell when a first condition of deactivating the first secondary cell is met; and the UE deactivates the at least one second secondary cell when a second condition of deactivating the at least one second secondary cell is met.

Specifically, the configuration message may carry identity information of the first secondary cell, an identity of at least one second secondary cell, and mapping relationship information. For example, one information element may be used to indicate identities of which second secondary cells are corresponding to the identity information of the first secondary cell. For example, an identity of the first secondary cell is 1, and the identities of second secondary cells that use the PUCCH of the first secondary cell are 2 and 3. For another example, one information element may be used to indicate an identity of a first secondary cell used by an identity of each second secondary cell. As illustrated below, an identity of a second secondary cell is 2, and an identity of a corresponding first secondary cell is 1; an identity of a second secondary cell is 3, and an identity of a corresponding first secondary cell is 1; or the like. For another example, one information element may be used to indicate information about a second secondary cell that uses the PUCCH of the first secondary cell. As illustrated below, identities of second secondary cells that use the PUCCH of the first secondary cell are 2 and 3. There may be one or more first secondary cells. A specific quantity of first secondary cells is not limited in the present invention.

In addition, the first condition includes at least one of the following: The UE receives a deactivation command that is used to deactivate the first secondary cell; a first deactivation timer of the first secondary cell expires; or all the second secondary cells are deactivated or meet a deactivation condition.

The second condition is: The UE receives a deactivation command that is used to deactivate the at least one second secondary cell, a second deactivation timer of the at least one second secondary cell expires, the first secondary cell meets the first condition of deactivation, or the first secondary cell is deactivated.

It should be noted that the first condition and the second condition may be used separately or in combination.

Further, when the UE deactivates the first secondary cell, the UE further needs to deactivate all the second secondary cells.

According to this embodiment of the present invention, it can be ensured that a secondary cell to which a PUCCH is introduced and a cell that uses the PUCCH are deactivated simultaneously. This reduces a performance loss caused by a failure in synchronization and ensures data transmission performance.

Figure 2:
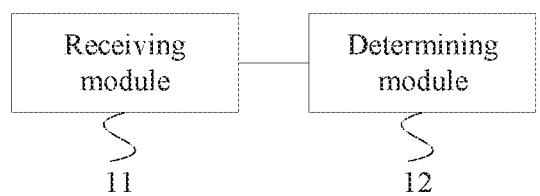
FIG. 2 is a schematic structural diagram of Embodiment 1 of an apparatus for determining an application time of a CSI report according to an embodiment of the present invention.

FIG. 2 is a schematic structural diagram of Embodiment 1 of an apparatus for determining an application time of a CSI report according to the present invention. As shown in FIG. 2, the apparatus for determining an application time of a CSI report according to this embodiment of the present invention includes a receiving module 11 and a determining module 12.

The receiving module 11 is configured to receive a configuration message sent by a base station; the determining module 12 is configured to determine, according to the configuration message received by the receiving module, a type of a physical uplink control channel PUCCH that is used by a secondary cell to report a CSI report; the receiving module 11 is further configured to receive a secondary cell activation command that is sent by the base station and that carries a cell identity; and the determining module 12 is further configured to determine, according to the type of the PUCCH that is used by the secondary cell to report the CSI report and the secondary cell activation command, an application time of a CSI report of a secondary cell corresponding to the cell identity.

According to the apparatus for determining an application time of a CSI report provided in this embodiment of the present invention, UE receives a configuration message sent by a base station and determines, according to the configuration message, a type of a PUCCH that is used by a secondary cell to report a CSI report; and the UE receives a secondary cell activation command that is sent by the base station and that carries a cell identity, and determines, according to the type of the PUCCH that is used by the secondary cell to report the CSI report and the secondary cell activation command, an application time of a CSI report of a secondary cell corresponding to the cell identity. Because UE determines an application time of a CSI report of a secondary cell according to a type of a PUCCH that is used by a secondary cell to report a CSI report, a prior-art phenomenon is avoided that it cannot be ensured that a secondary cell applies a CSI report at a preset time, and reliability of a system is improved.

Optionally, the determining module 12 is specifically configured to: if a type of a PUCCH that is used by the secondary cell corresponding to the cell identity to report the CSI report is a PUCCH of a primary cell, start, at a preset time point after the receiving module 11 receives the secondary cell activation command, to apply the CSI report of the secondary cell corresponding to the cell identity.

Optionally, the determining module 12 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after a preset time point after the receiving module 11 receives the secondary cell activation command, to apply the CSI report of the secondary cell corresponding to the cell identity.

The apparatus for determining an application time of a CSI report according to this embodiment may be configured to execute the technical solution of the method for determining an application time of a CSI report provided in any embodiment of the present invention. An implementation principle and a technical effect of the apparatus are similar to those of the method, and are not further described herein.

Figure 3:
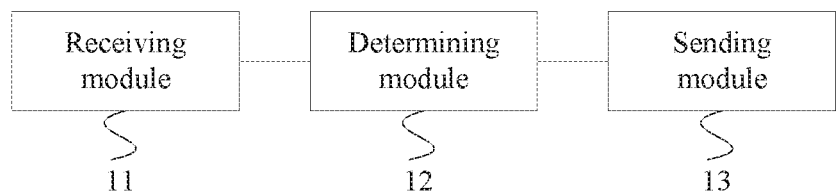
FIG. 3 is a schematic structural diagram of Embodiment 2 of an apparatus for determining an application time of a CSI report according to an embodiment of the present invention.

FIG. 3 is a schematic structural diagram of Embodiment 2 of an apparatus for determining an application time of a CSI report according to the present invention. As shown in FIG. 3, based on the embodiment shown in FIG. 2, in this embodiment, the apparatus further includes a sending module 13.

The sending module 13 is configured to send a channel sounding reference signal SRS to the base station.

The determining module 12 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the sending module 13 sends the channel sounding reference signal SRS to the base station, to apply the CSI report of the secondary cell corresponding to the cell identity.

The apparatus for determining an application time of a CSI report according to this embodiment may be configured to execute the technical solution of the method for determining an application time of a CSI report provided in any embodiment of the present invention. An implementation principle and a technical effect of the apparatus are similar to those of the method, and are not further described herein.

Figure 4:
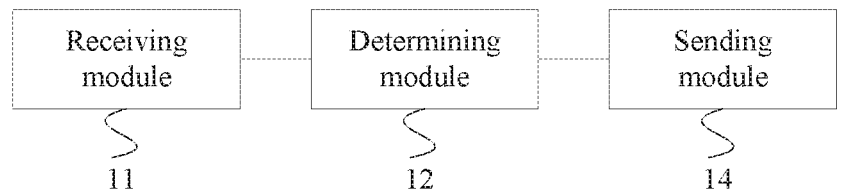
FIG. 4 is a schematic structural diagram of Embodiment 3 of an apparatus for determining an application time of a CSI report according to an embodiment of the present invention.

FIG. 4 is a schematic structural diagram of Embodiment 3 of an apparatus for determining an application time of a CSI report according to the present invention. As shown in FIG. 4, based on the embodiment shown in FIG. 2, in this embodiment, the apparatus further includes a sending module 14.

The sending module 14 is configured to send a preamble to the base station.

The determining module 12 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the sending module 14 sends the preamble to the base station, to apply the CSI report of the secondary cell corresponding to the cell identity.

The apparatus for determining an application time of a CSI report according to this embodiment may be configured to execute the technical solution of the method for determining an application time of a CSI report provided in any embodiment of the present invention. An implementation principle and a technical effect of the apparatus are similar to those of the method, and are not further described herein.

Figure 5:
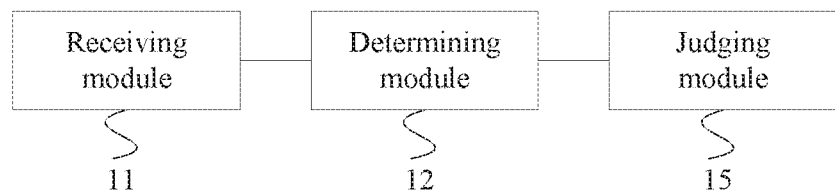
FIG. 5 is a schematic structural diagram of Embodiment 4 of an apparatus for determining an application time of a CSI report according to an embodiment of the present invention.

FIG. 5 is a schematic structural diagram of Embodiment 4 of an apparatus for determining an application time of a CSI report according to the present invention. As shown in FIG. 5, based on the embodiment shown in FIG. 2, in this embodiment, the apparatus further includes a judging module 15.

The judging module 15 is configured to determine whether the secondary cell including the PUCCH is in an active state.

The determining module 12 is specifically configured to: if a type of a PUCCH that is used by the secondary cell corresponding to the cell identity to report the CSI report is a PUCCH of a secondary cell, and the judging module 15 determines that the secondary cell including the PUCCH is in an active state, start, at a preset time point after a receiving module 11 receives the secondary cell activation command, to apply the CSI report of the secondary cell corresponding to the cell identity; or if a type of a PUCCH that is used by the secondary cell corresponding to the cell identity to report the CSI report is a PUCCH of a secondary cell, and the judging module 15 determines that the secondary cell including the PUCCH is in an inactive state, determine, according to an application time of a CSI report of the secondary cell including the PUCCH, the application time of the CSI report of the secondary cell corresponding to the cell identity.

Optionally, the application time of the CSI report of the secondary cell corresponding to the cell identity includes that the CSI report of the secondary cell corresponding to the cell identity is carried in a CSI report at a current time point corresponding to the application time and subsequent CSI reports.

The apparatus for determining an application time of a CSI report according to this embodiment may be configured to execute the technical solution of the method for determining an application time of a CSI report provided in any embodiment of the present invention. An implementation principle and a technical effect of the apparatus are similar to those of the method, and are not further described herein.

Figure 6:
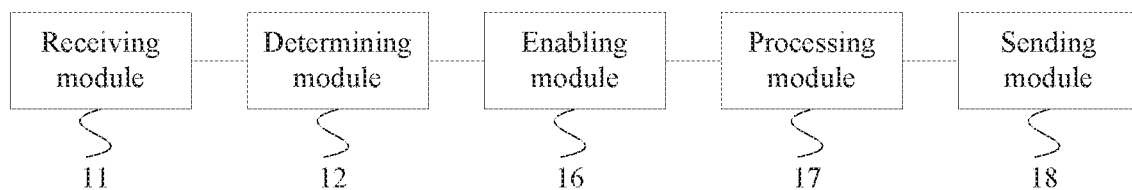
FIG. 6 is a schematic structural diagram of Embodiment 5 of an apparatus for determining an application time of a CSI report according to an embodiment of the present invention.

FIG. 6 is a schematic structural diagram of Embodiment 5 of an apparatus for determining an application time of a CSI report according to the present invention. As shown in FIG. 6, based on the embodiment shown in FIG. 2, in this embodiment, the apparatus further includes a starting module 16, a processing module 17, and a sending module 18.

The starting module 16 is configured to start, at a preset time point after the receiving module receives the secondary cell activation command, a deactivation timer of the secondary cell corresponding to the cell identity.

The processing module 17 is configured to trigger, after the preset time point after the receiving module 11 receives the secondary cell activation command, the following module to perform at least one of the following operations: the sending module 18 sends a listening reference signal to the base station, the sending module 18 sends a scheduling request signal to the base station, or the processing module 17 listens to a physical downlink control channel.

The apparatus for determining an application time of a CSI report according to this embodiment may be configured to execute the technical solution of the method for determining an application time of a CSI report provided in any embodiment of the present invention. An implementation principle and a technical effect of the apparatus are similar to those of the method, and are not further described herein.

Figure 7:
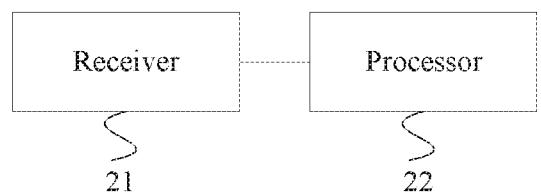
FIG. 7 is a schematic structural diagram of Embodiment 1 of UE according to an embodiment of the present invention.

FIG. 7 is a schematic structural diagram of Embodiment 1 of UE according to the present invention. As shown in FIG. 7, the UE provided in this embodiment of the present invention includes a receiver 21 and a processor 22.

The receiver 21 is configured to receive a configuration message sent by a base station; the processor 22 is configured to determine, according to the configuration message received by the receiver 21, a type of a physical uplink control channel PUCCH that is used by a secondary cell to report a CSI report; the receiver 21 is configured to receive a secondary cell activation command that is sent by the base station and that carries a cell identity; and the processor 22 is configured to determine, according to the type of the PUCCH that is used by the secondary cell to report the CSI report and the secondary cell activation command, an application time of a CSI report of a secondary cell corresponding to the cell identity.

The UE provided in this embodiment may be configured to execute the technical solution of the method for determining an application time of a CSI report provided in any embodiment of the present invention. An implementation principle and a technical effect of the UE are similar to those of the method, and are not further described herein.

Optionally, the processor 22 is specifically configured to: if a type of a PUCCH that is used by the secondary cell corresponding to the cell identity to report the CSI report is a PUCCH of a primary cell, start, at a preset time point after the receiver 21 receives the secondary cell activation command, to apply the CSI report of the secondary cell corresponding to the cell identity.

Optionally, the processor 22 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after a preset time point after the receiver 21 receives the secondary cell activation command, to apply the CSI report of the secondary cell corresponding to the cell identity.

Figure 8:
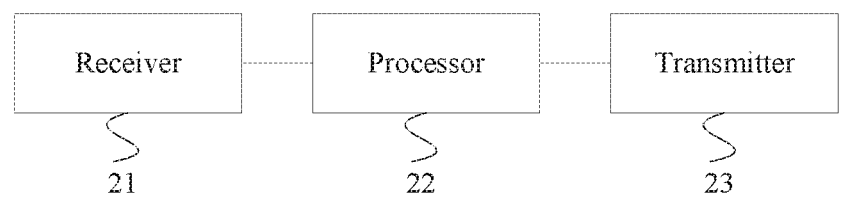
FIG. 8 is a schematic structural diagram of Embodiment 2 of UE according to an embodiment of the present invention.

FIG. 8 is a schematic structural diagram of Embodiment 2 of UE according to the present invention. As shown in FIG. 8, based on the embodiment shown in FIG. 7, in this embodiment, the UE further includes a transmitter 23.

The transmitter 23 is configured to send a channel sounding reference signal SRS to a base station.

The processor 22 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the transmitter 23 sends the channel sounding reference signal SRS to the base station, to apply the CSI report of the secondary cell corresponding to the cell identity.

Optionally, the transmitter 23 is configured to send a preamble to the base station.

The processor 22 is specifically configured to: if a type of a PUCCH that is used by the secondary cell corresponding to the cell identity to report the CSI report is a PUCCH of a secondary cell, and the secondary cell corresponding to the cell identity is a secondary cell including a PUCCH, start, after the secondary cell corresponding to the cell identity is activated and after the transmitter 23 sends the preamble to the base station, to apply the CSI report of the secondary cell corresponding to the cell identity.

Optionally, the processor 22 is specifically configured to: if a type of a PUCCH that is used by the secondary cell corresponding to the cell identity to report the CSI report is a PUCCH of a secondary cell, determine whether a secondary cell including a PUCCH is in an active state; and if the secondary cell including the PUCCH is in an active state, start, at a preset time point after a receiver 21 receives the secondary cell activation command, to apply the CSI report of the secondary cell corresponding to the cell identity; or if the secondary cell including the PUCCH is in an inactive state, determine, according to an application time of a CSI report of the secondary cell including the PUCCH, the application time of the CSI report of the secondary cell corresponding to the cell identity.

Optionally, the application time of the CSI report of the secondary cell corresponding to the cell identity includes that the CSI report of the secondary cell corresponding to the cell identity is carried in a CSI report at a current time point corresponding to the application time and subsequent CSI reports.

The UE provided in this embodiment may be configured to execute the technical solution of the method for determining an application time of a CSI report provided in any embodiment of the present invention. An implementation principle and a technical effect of the UE are similar to those of the method, and are not further described herein.

Figure 9:
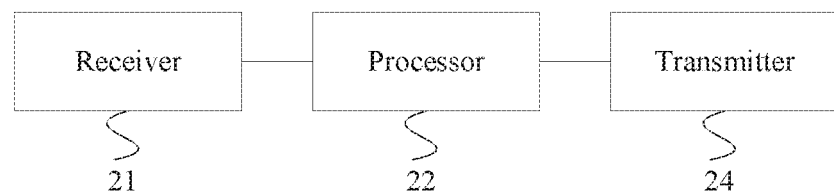
FIG. 9 is a schematic structural diagram of Embodiment 3 of UE according to an embodiment of the present invention.

FIG. 9 is a schematic structural diagram of Embodiment 3 of UE according to the present invention. As shown in FIG. 9, based on the embodiment shown in FIG. 7, in this embodiment, the UE further includes a transmitter 24.

The processor 22 is further configured start, at a preset time point after a receiver 21 receives the secondary cell activation command, a deactivation timer of the secondary cell corresponding to the cell identity; or the processor 22 is further configured to trigger, after a preset time point after the receiver 21 receives the secondary cell activation command, the transmitter 24 and/or the processor 22 to perform at least one of the following operations: the transmitter 24 sends a listening reference signal to the base station, the transmitter 24 sends a scheduling request signal to the base station, or the processor 22 listens to a physical downlink control channel.

The UE provided in this embodiment may be configured to execute the technical solution of the method for determining an application time of a CSI report provided in any embodiment of the present invention. An implementation principle and a technical effect of the UE are similar to those of the method, and are not further described herein.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not further described herein.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method, applied to a communication device, the method comprising:
    receiving a configuration message from a base station, wherein the configuration message is usable for determining that a channel status information (CSI) report of a first secondary cell is sent by using a physical uplink control channel (PUCCH) of a second secondary cell, and wherein the configuration message comprises at least one information element, and each information element of the at least one information element indicates an identity of a secondary cell corresponding to identity information of the second secondary cell;
    determining, according to the configuration message, identity information of the first secondary cell that uses the PUCCH of the second secondary cell to transmit the CSI report;
    receiving a secondary cell activation command instructing activation of the first secondary cell, wherein the secondary cell activation command is usable for instructing activation of at least one secondary cell and comprises a cell identity corresponding to the first secondary cell; and
    sending, at a preset time after the secondary cell activation command is received, a first CSI report of the first secondary cell over the PUCCH of the second secondary cell, wherein the second secondary cell is in active state.

2. The method according to claim 1, wherein the configuration message is further usable for determining that a CSI report of a third secondary cell is sent by using a PUCCH of a primary cell, and the secondary cell activation command further comprises a cell identity corresponding to the third secondary cell; and the method further comprises:
sending, at the preset time after the secondary cell activation command is received, the CSI report of the third secondary cell over the PUCCH of the primary cell.

3. The method according to claim 1, further comprising:
starting, at the preset time after the secondary cell activation command is received, a deactivation timer used for deactivating the first secondary cell.

4. The method according to claim 1, further comprising:
after the preset time after the secondary cell activation command is received, sending a sounding reference signal.

5. The method according to claim 1, further comprising:
after the preset time after the secondary cell activation command is received, sending a scheduling request.

6. The method according to claim 1, further comprising:
after the preset time after the secondary cell activation command is received, monitoring a physical downlink control channel.

7. An apparatus, comprising:
a non-transitory memory storage comprising instructions; and
one or more processors in communication with the memory storage, wherein the instructions, when executed by the one or more processors, cause the apparatus to:
receive a configuration message from a base station, wherein the configuration message is usable for determining that a channel status information (CSI) report of a first secondary cell is sent by using a physical uplink control channel (PUCCH) of a second secondary cell, and wherein the configuration message comprises at least one information element, and each information element of the at least one information element indicates an identity of a secondary cell corresponding to identity information of the second secondary cell;
determine, according to the configuration message, identity information of the first secondary cell that uses the PUCCH of the second secondary cell to transmit the CSI report;
receive a secondary cell activation command from the base station, wherein the secondary cell activation command is usable for instructing activation of at least one secondary cell and comprises a cell identity corresponding to the first secondary cell; and
at a preset time point after the secondary cell activation command is received, send a first CSI report of the first secondary cell over the PUCCH of the second secondary cell, wherein the second secondary cell is in active state.

8. The apparatus according to claim 7, wherein the configuration message is further usable for determining that a CSI report of a third secondary cell is sent by using a PUCCH of a primary cell, and the secondary cell activation command further comprises a cell identity corresponding to the third secondary cell; and
wherein the instructions, when executed by the one or more processors, cause the apparatus further to:
send, at the preset time after the secondary cell activation command is received, the CSI report of the third secondary cell over the PUCCH of the primary cell.

9. The apparatus according to claim 7, wherein the instructions, when executed by the one or more processors, cause the apparatus further to:
start, at the preset time point after the secondary cell activation command is received, a deactivation timer used for deactivating the first secondary cell.

10. The apparatus according to claim 7, wherein the instructions, when executed by the one or more processors, cause the apparatus further to:
after the preset time point after the secondary cell activation command is received, send a sounding reference signal.

11. The apparatus according to claim 7, wherein the instructions, when executed by the one or more processors, cause the apparatus further to:
after the preset time point after the secondary cell activation command is received, send a scheduling request.

12. The apparatus according to claim 7, wherein the instructions, when executed by the one or more processors, cause the apparatus further to:
after the preset time point after the secondary cell activation command is received, monitor a physical downlink control channel.

13. A non-transitory computer readable storage medium, wherein the non-transitory computer readable storage medium stores a program, and when the program is executed, the following operations are performed:
receive a configuration message from a base station, wherein the configuration message is usable for determining that a channel status information (CSI) report of a first secondary cell is sent by using a physical uplink control channel (PUCCH) of a second secondary cell, and wherein the configuration message comprises at least one information element, and each information element of the at least one information element indicates an identity of a secondary cell corresponding to identity information of the second secondary cell;
determine, according to the configuration message, identity information of the first secondary cell that uses the PUCCH of the second secondary cell to transmit the CSI report;
receive a secondary cell activation command, wherein the secondary cell activation command is usable for instructing activation of at least one secondary cell and comprises a cell identity corresponding to the first secondary cell; and
send, at a preset time point after the secondary cell activation command is received, a first CSI report of the first secondary cell over the PUCCH of the second secondary cell, wherein the second secondary cell is in active state.

14. The non-transitory computer readable storage medium according to claim 13, wherein the configuration message is further usable for determining that a CSI report of a third secondary cell is sent by using a PUCCH of a primary cell, and the secondary cell activation command further comprises a cell identity corresponding to the third secondary cell; and the operations further comprise:
sending, at the preset time after the secondary cell activation command is received, the CSI report of the third secondary cell over the PUCCH of the primary cell.

15. The non-transitory computer readable storage medium according to claim 13, wherein the operations further comprise:

starting, at the preset time point after the secondary cell activation command is received, a deactivation timer to deactivate the first secondary cell.

16. The non-transitory computer readable storage medium according to claim 13, wherein the operations further comprise:
after the preset time point after the secondary cell activation command is received, sending a sounding reference signal.

17. The non-transitory computer readable storage medium according to claim 13, wherein the operations further comprise:
after the preset time point after the secondary cell activation command is received, sending a scheduling request.

18. The non-transitory computer readable storage medium according to claim 13, wherein the operations further comprise:
after the preset time point after the secondary cell activation command is received, monitoring a physical downlink control channel.

19. The method according to claim 1, wherein a time between receiving the secondary cell activation command and sending the first CSI report of the first secondary cell over the PUCCH of the second secondary cell is different than a time between receiving another secondary cell activation command instructing activation of a third secondary cell and a fourth secondary cell, and sending a second CSI report of the third secondary cell over a PUCCH of the fourth secondary cell.

20. The non-transitory computer readable storage medium according to claim 13, wherein a time between receiving the secondary cell activation command and sending the first CSI report of the first secondary cell over the PUCCH of the second secondary cell is different than a time between receiving another secondary cell activation command instructing activation of a third secondary cell and a fourth secondary cell, and sending a second CSI report of the third secondary cell over a PUCCH of the fourth secondary cell.

* * * * *